(12) United States Patent
Katsuda et al.

(10) Patent No.: US 6,224,098 B1
(45) Date of Patent: May 1, 2001

(54) GAS GENERATOR FOR AIR BAG AND AIR BAG SYSTEM

(75) Inventors: Nobuyuki Katsuda, Himeji; Masayuki Ueda, Yokohama, both of (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/078,579

(22) Filed: May 14, 1998

(30) Foreign Application Priority Data

Oct. 8, 1997 (JP) .................................................... 9-276216

(51) Int. Cl.⁷ .................................................... B60R 21/16
(52) U.S. Cl. ............................................. 280/741; 280/731
(58) Field of Search ........................................ 280/731, 741

(56) References Cited

U.S. PATENT DOCUMENTS

| 5,314,203 | * | 5/1994 | Adams et al. | 280/731 |
| 5,433,475 | | 7/1995 | Kokeguchi . | |
| 5,487,561 | * | 1/1996 | Mandzy et al. | 280/741 |
| 5,613,705 | * | 3/1997 | Hock et al. | 280/741 |
| 5,624,134 | * | 4/1997 | Iwai et al. | 280/741 |

FOREIGN PATENT DOCUMENTS

| 5024498 | 2/1993 | (JP) . |
| 8183687 | 7/1996 | (JP) . |
| 9610494A1 | 4/1996 | (WO) . |

* cited by examiner

*Primary Examiner*—Kenneth R. Rice

(57) ABSTRACT

A gas generator is provided with a nonazide gas generating agent stored in a housing, and a plurality of openings for controlling combustion of the gas generating agent so that gas generated by the gas generating agent passes through the openings toward the air bag. The gas generator can be made smaller in size and lighter in weight by controlling the internal pressure of the gas generator, upon actuation, to be equal to or greater than 60 kg/cm², but less than 100 kg/cm², by adjusting the total area of the openings relative to the amount of the generated gas.

20 Claims, 2 Drawing Sheets

GAS GENERATOR FOR AIR BAG AND AIR BAG SYSTEM

FIELD OF THE INVENTION

The present invention relates to a gas generator for an air bag for protecting a passenger from an impact, and an air bag system. In particular, the invention is concerned with a gas generator for an air bag, which enables a stable combustion of a nonazide gas generating agent.

BACKGROUND OF THE INVENTION

In a conventional gas generator of the above type, a gas generating agent containing sodium azide as a base has been used. Since harmful slags and mist are generated due to the use of sodium azide, it has been proposed to use a nonazide gas generating agent in which a nitrogen containing compound other than inorganic azide is combined with an oxidizer. However, the nonazide gas generating agent generally has a linear burning velocity of 30 mm/sec or less under a pressure of 70 kg/cm$^2$, and it is difficult to burn this type of gas generating agent with high stability to achieve stable or constant output performance. An example of a gas generator for an air bag using a nonazide gas generating agent for achieving stable combustion has been proposed in International Publication No. WO 96/10494, wherein a rupture plate is provided at an opening that allows passage of a gas generated by the gas generating agent, and the maximum pressure inside the gas generator is controlled by adjusting the strength and thickness of the rupture plate and the size of the opening. When the rupture plate is used in an attempt to control the internal pressure of the gas generator in this manner, however, it was found that the start of actuation or operation of the gas generator tends to be delayed since the rupture plate does not rupture unless a pressure greater than a certain level is applied to the plate, burning of the nonazide gas generating agent is not stabilized, which often results in variations in the output performance of the gas generator, and the amount of CO gas generated as a result of the combustion is increased.

SUMMARY OF THE INVENTION

The present invention has been developed to overcome the above-described problems encountered in the prior art. It is an object of the invention to provide a gas generator for an air bag which is suite for stably burning a nonazide gas generating agent having a linear burning velocity of 30 mm/sec or less under a pressure of 70 kg/cm$^2$, and an air bag system using such a gas generator.

As a result of diligent studies for solving the problems, as described above, the inventor have found that in a small-sized container (having an internal volume of 120 cc or less), a desired output curve or characteristic suitable for inflation of an air bag can be obtained if the internal pressure of the gas generator, when the generator is being activated, is controlled by adjusting the total area of openings. The present invention was developed based on this finding.

The present invention relates to a gas generator for an air bag wherein a gas generating agent is stored in a housing, and a plurality of openings are provided for controlling combustion of the gas generating agent so that the gas generated by the gas generating agent passes through the openings, to be directed toward the air bag. The gas generator is characterized in that the internal pressure of the gas generator, when the generator is being activated, is controlled by adjusting the total area of the openings relative to an amount of the gas generated by the gas generating agent.

In practicing the present invention, it is preferable that each of the openings has a diameter of 2 to 5 mm assuming that the opening has a circular shape. Since the opening does not necessarily have a circular shape, but may have a shape that can be approximated to a circle, the size of the opening is define not as an actual dimension measured in a certain direction, but as a diameter of the circle to which the opening is approximated. The size thus defined is a diameter of a complete round having the same area as the opening. If the diameter of the opening, when it is regarded as a circle, is less than 2 mm, an air bag component provided at outlets of the openings may be damaged even if the ratio of the total area of the openings to the amount of the generated gas is equal to or smaller than 2.50 cm$^2$/mol. The air bag component located at the outlets of the openings may be an air bag in the case where the openings are gas discharge ports formed through a diffuser shell of a housing, or a filter or a coolant in the case where the openings are formed through a partition wall of a combustion chamber inside the housing. If the number of the openings is increased to prevent such damages, the number of holes that provide the openings will be excessively large, resulting in an increased process cost for producing the gas generator.

In a preferred form of the present invention, in which the housing consists of a small-size container having an internal volume of 120 cc or less the ratio of the total area of the openings to the amount of the generated gas is adjusted to 0.50 to 2.50 cm$^2$/mol, preferably, 0.50 to 2.0 cm$^2$/mol, and a suitable nonazide composition for the gas generating agent is selected, and the diameter and number of the openings are suitably determined, such that the maximum internal pressure is controlled to be equal to or greater than 60 kg/cm$^2$ and less than 100 kg/cm$^2$. In this manner, a desired output curve or characteristic suitable for inflation of the air bag can be achieved. The total area of the openings is determined by multiplying the area of a single hole by the number of holes. Thus, the diameter or size of a single opening or hole is determined by taking damages to the air bag into account, as described above, and the number of openings is then determined based on the diameter of the single opening.

In the gas generator of the present invention, the gas generating agent is stored inside the generator, and a plurality of openings for controlling combustion of the gas generating agent are formed through the housing of the generator, and/or a partition wall located inside the housing, such that the openings extend in a direction in which the gas generated by the gas generating agent flows toward the air bag. The opening area of each of the openings corresponds to that of a circle having an inside diameter of 2 to 5 mm, and a total of 12 to 24 openings, preferably, 16 to 20 openings, are formed through the housing, or the partition wall inside the housing, or both of the housing in a circumferential direction and the partition wall inside the housing. In the present invention, the maximum internal pressure of the gas generator, when it is actuated, is regulated by the openings formed through the housing or the partition wall inside the housing, or the openings formed through both the housing and the partition wall. For instance, where the openings are formed through both of the housing and the partition wall inside the housing, and the interior pressure of the housing is controlled or regulated by the openings of either one of the housing and the partition wall, the openings of the other of the housing and the partition wall may be suitably formed so that these openings do not contribute to control of the internal pressure.

The openings through which the gas generated by the gas generating agent passes may be arranged in an array or in a stagger form, in a circumferential Direction of the housing and/or the partition wall.

The above-indicated housing may be formed by casting or forging, or by press working a diffuser shell having openings (hereinafter, called gas discharge ports) through which the gas is discharged or ejected, and a closure shell having a central aperture, and joining the diffuser shell and the closure shell by a known welding method, such as plasma welding, friction welding, projection welding, electron beam welding, laser welding, or TIG welding. The housing is provided with gas discharge ports. The housing thus formed by press working can be easily manufactured at a reduced manufacturing cost. Each of the diffuser shell and closure shell may be formed from, for example, a stainless steel sheet having a thickness of 1.2 to 3.0 mm, preferably, 1.2 to 2.0 mm. The diffuser shell may have an outer diameter of 45 to 75 mm, preferably 65 to 70 mm, and the closure shell may have an outer diameter of 45 to 75 mm, preferably 65 to 70 mm. A steel sheet plated with nickel may be used in place of the stainless steel sheet. It is also preferable that the housing be formed with a flange that facilitates mounting of the housing, and a clearance or plenum of 1.0 to 4.0 mm which functions as a gas passage be formed between the outer circumferential wall of the housing and the coolant. The total height of the housing is preferably controlled to be in the range of 25 to 40 mm, more preferably, 30 to 35 mm.

The partition wall divides the interior of the housing into two or more chambers, and may be formed as needed within the housing. The partition wall, through which the plurality of openings for controlling combustion of the gas generating agent are formed according to the present invention, is located or oriented such that the gas generated in the combustion chamber, containing the gas generating agent, passes through the openings to be directed toward the air bag. For example, the partition wall may be provided between the gas generating agent storage chamber within the housing, and the coolant, or may include a combustion ring. The combustion ring is disposed within he housing to surround the combustion chamber, and numerous openings are formed through its circumferential wall, to control the maximum internal pressure of the gas generator upon combustion of the gas generating agent.

The partition wall may also be provided by accommodating a circumferential wall of a cylindrical member within the housing. The cylindrical member may be made of a welded tube formed by rounding stainless steel sheet having a thickness of 1.2 to 2.0 mm into a tube-like shape, and welding edges of the steel sheet. The cylindrical member may also be formed by pressing a steel sheet having a suitably selected thickness. When the partition wall is provided by the cylindrical member, the openings are formed through the cylindrical member.

If there is a need to inhibit entry of the atmosphere (moisture) into the housing, the openings are preferably closed by a seal tape having a width that is 2 to 3.5 times the diameter of each opening. The seal tape is used to close the openings only for the purpose of preventing entry of moisture, and does not impede passage of the generated gas through the openings at all, nor regulate the internal pressure of the housing. Namely, the maximum internal pressure does not change irrespective of whether the seal tape is present or not. Accordingly, the seal tape used in the present invention fulfills its intended function if its thickness is large enough to inhibit entry of moisture. According to the present invention, the maximum internal pressure of the housing is controlled only by adjusting the total area of the openings to raise the internal pressure in a short period of time. If the thickness of an aluminum tape, as the seal tape, is too large, for example, 200 μm or larger, the aluminum tape is not likely to rupture even when an eruptive gas occurs due to combustion of the gas generating agent, and a certain period of time is required prior to the rupture of the aluminum tape. In this case, the air bag system starts operating with a delay, and may not be able to accomplish its intended object. The aluminum tape may be an adhesive aluminum tape, or may be provided by means of an acrylic adhesive, hot melt type adhesive, or other type of known adhesive.

The gas generating agent used in the present gas generator may be a nonazide gas generating agent selected from those compositions containing tetrazole, tetrazole or nitrogen containing organic compound of these metallic salts or the like, and an oxygen containing oxidizer, such as alkali metal nitrate, as major components, and those compositions containing triaminoguanidine nitrate, carbohydrazide, or nitroguanidine as a fuel or a nitrogen source, and using a nitrate, chlorate, or perchlorate of an akali metal or alkaline earth metal as an oxidizer. Other nonazide gas generating agents may also be suitably selected depending upon the required burning rate, non-toxicity, and desired burning temperature. The gas generating agent may be used in a suitable shape or form such as a pellet-like shape, a wafer-like shape, a hollow, columnar shape, porous form, or a disc-like shape.

In one form of the present invention, he central cylindrical member obtained by forming a steel sheet into a cylindrical shape is provided within the housing, and ignition means comprising a transfer charge and an igniter is stored within the central cylindrical member. In addition, a coolant for cooling the generated gas, a filter for entrapping or removing combustion residues, and a cushion member for solid bodies of the gas generating agent may be provided around the combustion chamber.

The coolant member may be formed by superposing some layers of plain-stitch wire mesh screens in radial directions, and compressing the wire screens in the radial and axial directions, for example The thus formed coolant member has a complicated porous structure that provides an excellent scavenging effect, and therefore may be used as a coolant/filter unit having both cooling and scavenging functions. In this case, a filter member can be eliminated. Between the coolant member and the central cylindrical member a coolant support member or members may be provided for inhibiting movement of the coolant member. The coolant support member may be formed from, for example, a stainless steel plate or a steel plate having a thickness of 0.50 to 1.0 mm, and may include bent portions formed at its inner and outer circumferential portions. Thus, the coolant support member can be fixed in position due to the resilient force of the bent portions. Further, the coolant support member may be provided with a flame-prevention plate for protecting the inner circumferential surface of the coolant member against a flame.

By controlling the size or diameter of the openings through which the gas generated by the gas generating agent passes towards the air bag, and the ratio of the total area of the openings to the amount of the generated gas, the gas generator of the present invention is able to burn the gas generating agent, in particular, nonazide gas generating agent, with high stability, without using any rupture plate, so that a desired output curve or characteristic suitable for inflation of the air bag can be achieved even with a small-sized container. Accordingly, the size and weight of the gas generator for an air bag can be advantageously reduced.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENT OF THE INVENTION

Figures 1, 2:
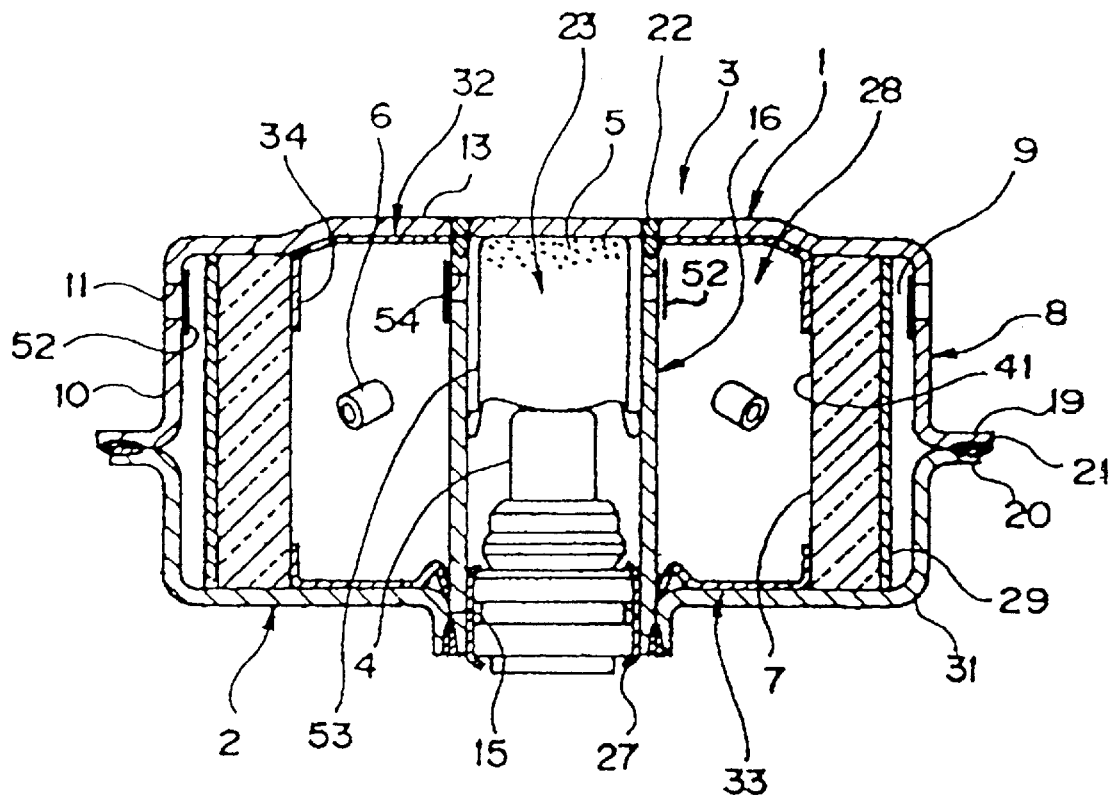
FIG. 1 is a cross-sectional view of a gas generator according to one embodiment of the present invention.
FIG. 2 is a cross-sectional view of a gas generator according to another embodiment of the present invention.
Figure 3:
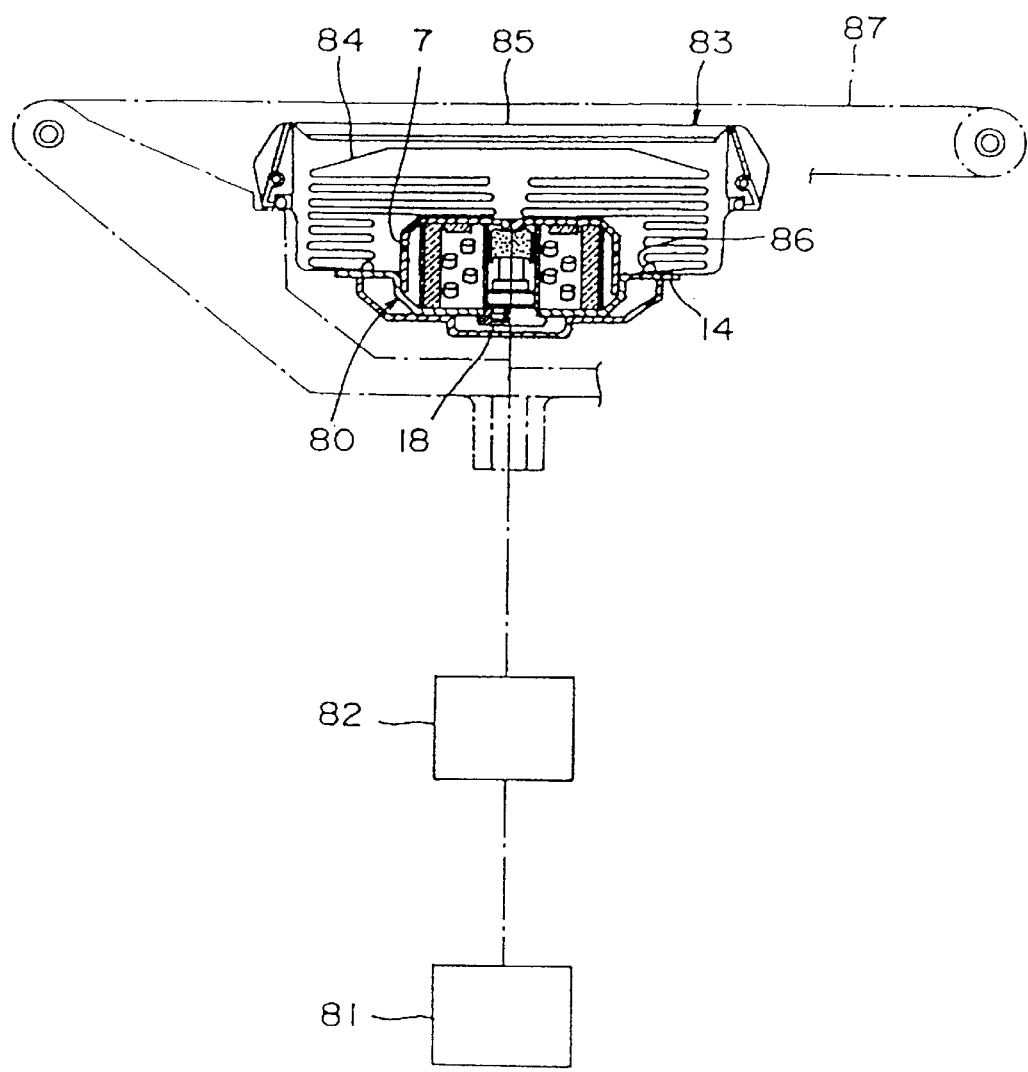
FIG. 3 is a view showing the construction of an air bag system of the present invention.

Referring to the drawings, preferred embodiments of the present invention will be described. FIG. 1 is a cross-sectional view showing a gas generator according to one embodiment of the present invention. FIG. 2 is a cross-sectional view showing a gas generator according to another embodiment of the invention. FIG. 3 is a view showing the construction of an air bag system of the present invention.

Gas Generator for Air Bag

FIG. 1 is a vertical cross-sectional view of one example of a gas generator for an air bag according to the present invention. The gas generator includes a housing 3 which includes a diffuser shell 1 and a closure shell 2, a central cylindrical member 16 disposed within the housing 3, igniting means in the form of an igniter 4 and a transfer charge 5 provided in a hollow portion of the central cylindrical member 16, and gas generating means in the form of solid bodies of a gas generating agent 6, which are ignited by the igniter 4 and transfer charge 5 to generate combustion gas. The gas generator further includes a coolant member in the form of a coolant/filter 7 which is disposed around the gas generating agent 6, coolant support members in the form of plate members 32, 33 which are provided at the opposite end portions of the coolant/filter 7, and an outer layer 29 which includes a layered wire net structure that is fitted on the outer circumferential surface of the coolant/filter 7 to prevent deformation of the coolant.

The diffuser shell 1 is formed in shape by pressing a stainless steel sheet, and includes a circumferential wall portion 10 through which eighteen openings (gas discharge ports 11), each having a diameter of 3 mm when it is assumed to be a circle, are formed in an array at equal intervals as viewed in the circumferential direction. The maximum internal pressure of the housing is controlled by the openings 11. The closure shell 2 is also formed in shape by pressing a stainless steel sheet, and a central aperture 15 is formed through a central portion of a bottom wall of the closure shell 2. The central cylindrical member 16 is fitted in the central aperture 15.

The diffuser shell 1 and the closure shell 2 include respective flange portions 19, 20. The flange portions 19, 20 are superposed on each other, and subjected to laser beam welding 21, so that the diffuser shell 1 and the closure shell 2 are joined together to form the housing 3. The internal volume of the housing 3 is 120 cc, and the total area of the gas discharge ports is 1.13 cm².

The central cylindrical member 16 is fixed to the housing 3 by electron beam welding 22 so that the cylindrical member 16 and the housing 3 are formed as an integral assembly. The central cylindrical member 16 consists of a stainless steel pipe which is open at opposite ends, and has a thickness of 1.2 to 3.0 mm, preferably, 1.2 to 2.0 mm, and an outer diameter of 17 to 22 mm, preferably, 17 to 20 mm. Six through-holes 54, each having a diameter of 2.5 mm, are formed at equal intervals through a circumferential wall of the central cylindrical member 16. An igniting means storage chamber 23 is formed inside the central cylindrical member 16, and the igniting means, namely, the ignite 4 and a transfer charge container 53, are stored in the igniting means storage chamber 23. The igniter 4 is actuated in response to a signal from a sensor (not show), and the transfer charge 5, filling the transfer charge container 53, is ignited or fired by the igniter 4. the central cylindrical member 16 includes an igniter holding member 27, which is crimped to fix the igniter 4 in position. A combustion chamber 28 is formed outside the central cylindrical member 16, and numerous solid bodies of the gas generating agent 6 are contained in the combustion chamber 28. Each body of the gas generating agent 6 has a hollow, columnar shape or cylindrical shape, which is advantageous in that the combustion takes place at the outer and inner surfaces of the cylindrical body at the same time, and the overall surface area of each body of the gas generating agent 6 does not significantly change as the combustion proceeds. Appropriate type and amount of a nonazide gas generating composition is selected as the gas generating agent 6, and the size of the openings is controlled so that the ratio of the total area of the openings to the amount of generated gas is in the range of 0.50 to 2.50 cm²/mol, preferably, 0.50 to 2.0 cm²/mol, and so that the maximum internal pressure upon actuation of the gas generator is in the range of 60 kg cm² to 100 kg/cm².

The coolant/filter 7 is disposed to surround the gas generating agent 6, and defines an annular chamber, i.e., combustion chamber 28, around the central cylindrical member 16. The coolant/filter 7 is formed by superposing layers of plain-stitch wire screens made of stainless steel in the radial direction, and compressing the wire screens in the radial and axial directions. Thus, the coolant/filter 7 has a complicated porous structure, and provides an excellent scavenging effect. The outer layer 29 having a layered wire net structure is provided outside the coolant/filter 7 to prevent the coolant/filter 7 from swelling or expanding outward due to a gas pressure and closing a space 9 between the coolant/filter 7 and the housing. The coolant/filter 7 defines the combustion chamber 28, and serves to cool the combustion gas generated in the combustion chamber 28 while scavenging or entrapping combustion residues. When the pressure inside the gas generator is not regulated by the openings of the housing, a combustion ring having a large number of openings may be provided on the inner circumference of the coolant/filter 7, so that the internal pressure is controlled by the openings of the combustion ring. Corner portions of an outer circumferential wall 8 of the housing 3 have a large radius of curvature (R), and inner circumferential surfaces 31 of these corner portions determine the position of the coolant/filter 7, and restrict or inhibit radial movement of the filter 7. Instead of the inner circumferential surfaces 31, a protruding portion abutting on the outer circumferential wall 8 of the housing may be provided at the end portions of the coolant/filter, so that the protruding portion serves as means for positioning the coolant/filter and inhibiting radial movement of the filter. In addition, the plate member 32 provided at the upper end portion of the coolant/filter 7 and the plate member 33 provided at the lower end portion of the filter 7 serve to prevent movement of the coolant/filter 7. The plate member 32 at the upper end portion of the coolant/filter includes a circumferential wall portion 34, which is disposed facing the through-holes 54 that allow ejection of a flame produced by the igniting means, while covering a portion of the inner circumferential surface 41 of the coolant/filter 7 located close to the through-holes 54.

The space 9 is formed between the outer circumferential wall 8 of the housing an the outer layer 29 fitted on the coolant/filter 7. In the presence of the space 9, a gas passage having an annular cross section, as viewed in the radial direction, is formed around the coolant/filter 7.

In the gas generator as shown in FIG. 1, an aluminum tape 52 is attached to the diffuse shell 1 to close the gas discharge ports 11 to inhibit entry of moisture from the exterior space into the housing 3. The thickness of the aluminum tape 52 is controlled to, for example, 50 μm, so that the aluminum tape 52 only satisfies the moisture-proof function, without impeding ejection of the gas generated by the gas generating agent 6.

In assembling the gas generator of the present embodiment, the diffuser shell 1, to which the central cylindrical member 16 is joined, is placed on its bottom provided by a protruding circular portion 3 thereof, and the plate member 32 is passed along the central cylindrical member 16. The coolant/filter 7 is then fitted on the outer face of the circumferential wall portion of the plate member 32, so that the coolant/filter 7 is positioned by the plate member 32. The space inside the coolant/filter 7 is filled with solid bodies or pellets of the gas generating agent 6, and then covered with the plate member 33. Thereafter, the closure shell 2 is mounted on the plate member 33 by inserting the central cylindrical member 16 through the central aperture 15 of the closure shell 2, and the flange portion 20 of the closure shell 2 is superposed on the flange portion 19 of the diffuser shell 1. In this state, the diffuser shell 1 and the closure shell 2, and the closure shell 2 and the central cylindrical member 16 are joined together by laser welding. In the final step, the transfer charge container 53 and the igniter 4 are inserted into the central cylindrical member 16, and the igniter holding member 2 is crimped to fix the container 53 and igniter 4 in position. The plate member 33 stated above also has a function of welding beam protection plate in the event of welding.

In the present gas generator constructed as described above, when an impact is detected by a sensor (not shown), a signal is transmitted from the sensor to the igniter 4, which is then actuated to ignite or fire the transfer charge 5 in the transfer charge container 53, thereby producing a high-temperature flame. The flame is ejected through the through-holes 54 of the central cylindrical member 16, to ignite the gas generating pellets 6 in the vicinity of the through-holes 54, and then directed downward by the circumferential wall portion 34 to ignite the gas generating pellets 6 located in the lower portion of the combustion chamber. As a result, the gas generating pellets 6 burn and produce a high-temperature, high-pressure gas, and the combustion gas thus produced passes through the whole region of the coolant/filter 7, in which the gas is effectively cooled and the combustion residues are scavenged or entrapped during the passage. The combustion gas thus cooled and purified passes through the gas passage (space 9), and ruptures the aluminum tape 52, to be ejected or expelled through the gas discharge ports 11 and flow into an air bag. Consequently, the air bag inflates to form a cushion between a passenger and a hard structure, thereby to protect the passenger from the impact.

FIG. 2 is a cross-sectional view showing a gas generator for an air bag according to another embodiment of the present invention.

In the gas generator for an air bag as shown in FIG. 2, the maximum internal pressure of a housing 63 is controlled by openings 77 formed through the housing 63, as in the gas generator shown in FIG. 1. Appropriate type and amount of a nonazide gas generating composition is selected as a gas generating agent 66 as in the embodiment of FIG. 1, and the size of the openings 77 is determined so that the ratio of the total area of the openings to the amount of the gas generated by the gas generating agent 66 is in the range of 0.50 to 2.50 cm$^2$/mol, preferably, in the range of 0.50 to 2.0 cm$^2$/mol, and so that the maximum internal pressure upon actuation of the gas generator is equal to or higher than 60 kg/cm$^2$, but lower than 100 kg/cm$^2$.

The gas generator includes the housing 63 that includes a diffuser shell 61 and a closure shell 62, an igniter 64 disposed within a storage space of the housing 63, solid bodies of the gas generating agent 66 which are ignited by the igniter 64 to generate combustion gas, and a coolant/filter 67 which defines a gas generating agent storage chamber 84 that stores solid bodies or pellets of the gas generating agent 66. In the present embodiment, too, a seal tape 96 exclusively used for the purpose of moisture-proofing is attached to the diffuser shell 61 to close the openings 77. In FIG. 2, reference number 91 denotes a filter support member.

Air Bag System

FIG. 3 shows an example of an air bag system including the gas generator of the present invention. The air bag system includes a gas generator 80, an impact sensor 81, a control unit 82, a module case 83, and an air bag 84.

The gas generator, as explained above with reference to FIG. 1, is used as the gas generator 80.

The impact sensor 81 may include a semiconductor type acceleration sensor, for example. In this semiconductor type acceleration sensor, four semiconductor strain gauges are formed on a beam of a silicon substrate that is adapted to deflect upon application of acceleration thereto, such that these strain gauges are connected in a bridge form. The beam is deflected upon application of acceleration thereto, and strains occur on the surface of the beam. The resistance of the semiconductor strain gauges changes due to the strains, and the changes in the resistance are detected as voltage signals that are proportional to the applied acceleration.

The control unit 82 includes an ignition determining circuit, which receives signals from the semiconductor type acceleration sensor. The control unit 82 starts computing at a point of time when an impact signal from the acceleration sensor exceeds a predetermined value, and generates an actuation signal to the igniter 18 of the gas generator 80 when the result of computing exceeds a certain value.

The module case 83 is formed of, for example, polyurethane, and includes a module cover 85. The air bag 84 and gas generator 80 are accommodated in the module case 83, and the module case 83, air bag 84, and the gas generator 80 constitute a pad module which is attached to a steering wheel 87 of an automobile.

The air bag 84 is formed of nylon (for example, nylon 66), polyester, or other material, and its end portion 86 defining an opening is fixed to a flange portion 14 of the gas generator so that the air bag 84, which is in a folded state, surrounds gas discharge ports 7 of the gas generator.

When the semiconductor type acceleration sensor 81 detects an impact upon crash of the automobile, an output signal of the sensor 81 is transmitted to the control unit 82, and the control unit 82 starts computing at the point of time when the impact signal from the sensor exceeds a certain value. The control unit 82 then generates an actuation signal to the igniter 18 of the gas generator 80 when the result of computing exceeds a certain value. As a result, the igniter 18 is actuated to ignite the gas generating agent, so that the gas generating agent burns and produces combustion gas. The gas thus generated is expelled into the air bag 84 to inflate the air bag 84 while breaking the module cover 85, so that the inflated air bag 84 forms a cushion between the steering wheel 87 and the passenger so as to absorb the impact.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gas generator for an air bag, comprising:
   a plurality of openings for discharging a combustion gas generated within a combustion chamber, said plurality of openings having a predetermined total open area; and a gas generating agent for generating the combustion gas upon a combustion thereof, said gas generating agent being a non-azide gas generating agent and having a composition such that a ratio of the predetermined total open area to a total amount of the combustion gas is in a range of 0.5 to 2.5 $cm^2/mol$, and a maximum inner pressure within the combustion chamber due to the combustion gas is equal to or larger than 60 $kg/cm^2$ and less than 100 $kg/cm^2$.

2. A gas generator for an air bag according to claim 1, wherein each of the openings has a diameter of 2 to 5 mm when each of said opening has a circular shape.

3. A gas generator for an air bag according to claim 1, wherein an internal volume of a gas generator housing is equal to or less than 120 cc.

4. A gas generator for an air bag according to claim 1, wherein said non-azide gas generating agent has a linear burning velocity of 30 mm/sec or less under a pressure of 70 $kg/cm^2$.

5. A gas generator for an air bag according to claim 1, further comprising:
   a housing that accommodates said gas generating agent therein; and
   a partition wall provided within said housing, said partition wall being located in a passage through which the combustion gas generated within the combustion chamber is discharged, wherein
   said plurality of openings are formed in said partition wall.

6. A gas generator for an air bag according to claim 5, wherein a total of twelve to twenty-four openings are formed in said partition wall, and arranged in a circumferential direction of said partition wall.

7. A gas generator for an air bag according to claim 5, further comprising:
   a moisture-proof seal tape which seals said openings formed in said partition wall.

8. A gas generator for an air bag according to claim 1, further comprising:
   a housing that accommodates said gas generating agent, wherein
   said plurality of openings are formed in said housing.

9. A gas generator for an air bag according to claim 8, wherein a total of twelve to twenty-four openings are formed in said housing, and arranged in a circumferential direction of said housing.

10. A gas generator for an air bag according to claim 8, further comprising:
    a moisture-proof seal tape which seals said openings formed in said housing.

11. A gas generator for an air bag according to claim 1, wherein the openings have a single common area.

12. A gas generator for an air bag according to claim 1, wherein the openings have two or more different areas.

13. An air bag system, comprising:
    a gas generator including,
       a plurality of openings for discharging a combustion gas generated within a combustion chamber, said plurality of openings having a predetermined total open area, and
       a gas generating agent for generating the combustion gas upon a combustion thereof, said gas generating agent being a non-azide gas generating agent and having a composition such that a ratio of the predetermined total open area to a total amount of the combustion gas is in a range of 0.5 to 2.5 $cm^2/mol$, and a maximum inner pressure within the combustion chamber due to the combustion gas is equal to or larger than 60 $kg/cm^2$ and less than 100 $kg/cm^2$;
    an impact sensor that detects an impact and generates an output signal to said gas generator;
    an air bag which is inflated by the combustion gas generated by said gas generator; and
    a module case that stores said air bag.

14. A method of controlling a combustion of a gas generating agent provided within an air bag gas generator housing, said gas generating agent being a non-azide gas generating agent, and generating a combustion gas by a combustion thereof, comprising:
    providing a plurality of openings for discharging a combustion gas generated within a combustion chamber, said openings having a predetermined total open area; and
    determining a composition of the gas generating agent such that a ratio of the predetermined total open area to a total amount of the combustion gas is in a range of 0.5 to 2.5 $cm^2/mol$, and a maximum inner pressure within the combustion chamber due to the combustion gas is equal to or larger than 60 $kg/cm^2$ and less than 100 $kg/cm^2$.

15. The method of claim 14, wherein said providing step includes the step of setting a diameter of each of the openings to 2 to 5 mm when each of said opening has a circular shape.

16. The method of claim 14, wherein the providing step includes the step of providing the non-azide gas generating agent having a linear burning velocity of 30 mm/sec or less under a pressure of 70 $kg/cm^2$.

17. The method of claim 14, wherein said providing step includes the steps of,
    providing a partition wall within said air bag gas generator housing, said partition wall being located in a passage through which the combustion gas generated within the combustion chamber is discharged, and
    forming said plurality of openings in said partition wall.

18. The method of claim 14, wherein said providing step includes the step of,
    forming said plurality of openings in said air bag gas generator housing.

19. The method of claim 18, further comprising:
    providing a moisture-proof seal tape that seals said openings.

20. The method of claim 17, further comprising:
    providing a moisture-proof seal tape that seals said openings.

* * * * *